Figure 4:
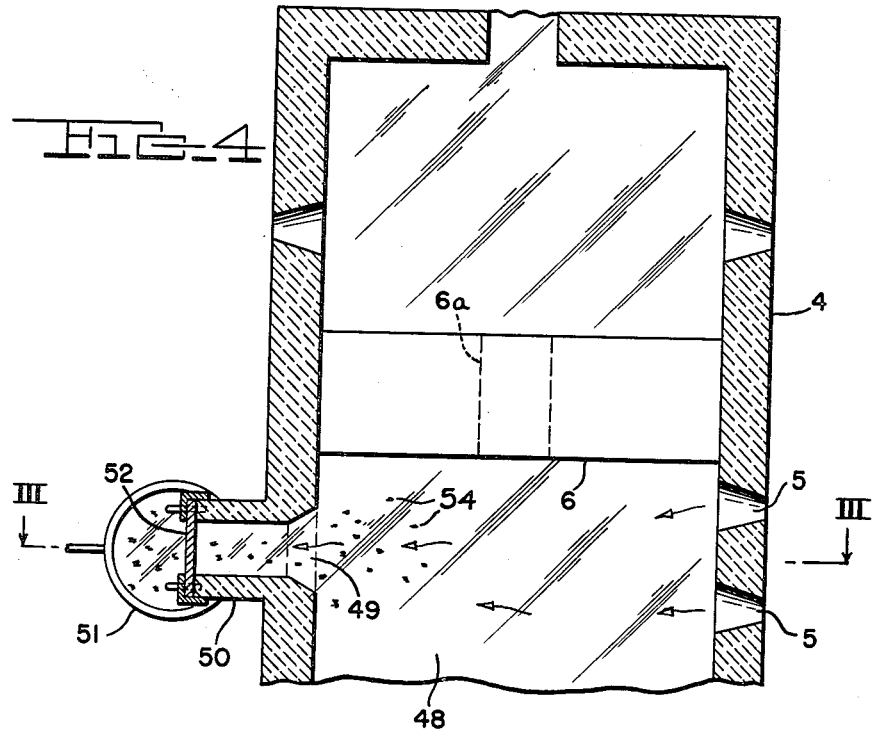

May 20, 1952 — G. E. HOWARD — 2,597,585
GLASS MELTING METHOD AND APPARATUS
Filed July 1, 1949 — 2 SHEETS—SHEET 1
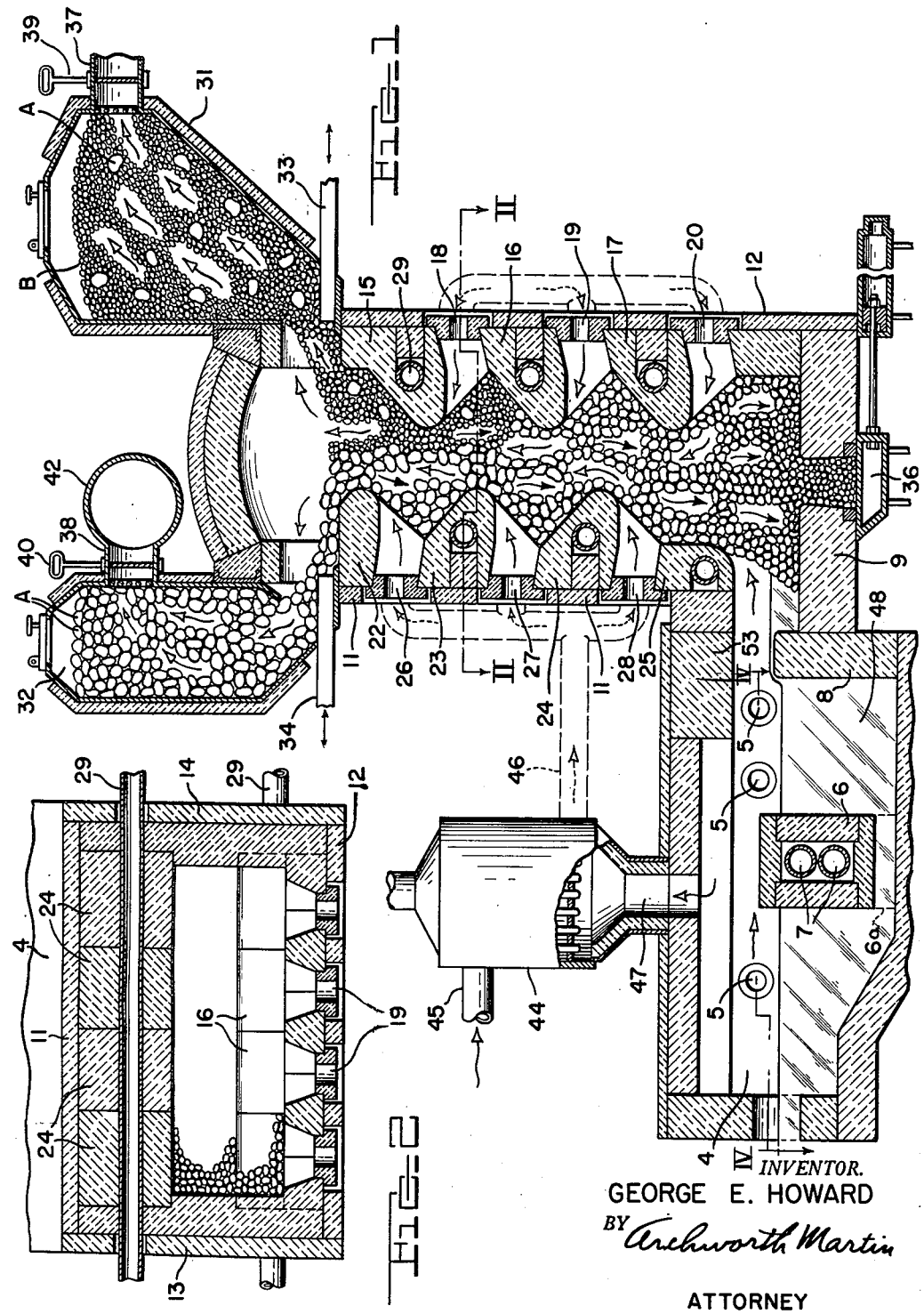
INVENTOR.
GEORGE E. HOWARD
BY Archworth Martin
ATTORNEY May 20, 1952        G. E. HOWARD        2,597,585
GLASS MELTING METHOD AND APPARATUS Filed July 1, 1949        2 SHEETS—SHEET 2

INVENTOR.
GEORGE E. HOWARD
BY Archworth Martin

ATTORNEY

Patented May 20, 1952

2,597,585

UNITED STATES PATENT OFFICE 2,597,585

GLASS MELTING METHOD AND APPARATUS

George E. Howard, Butler, Pa.

Application July 1, 1949, Serial No. 102,505

23 Claims. (Cl. 49—54)

This invention relates to a method and apparatus that is particularly suitable for the melting of glass-making materials and is a modification of the invention described and claimed in my application Serial No. 57,935, filed November 2, 1948 (Patent 2,564,783).

Generally stated, the invention involves the melting of glass batch materials in a stack, the materials usually including lime, soda, alumina and silica in fine granular form, these materials being preferably introduced into the stack in the form of briquettes.

Other materials such a broken silica brick or fused or sintered refractories of fairly large size and with a higher melting point than the batch briquettes are also introduced into the stack, in the form of a separate stream or at a separate zone in the upper portion of the stack.

At this zone, and downwardly therefrom, the large, more slowly eroding lumps fill the lower portion of the stack after the manner of a filter bed whose interstitial spaces provide passageways for the downward flow of the liquified batch briquettes and for the upward travel of the heating gases to a stack or an exhaust fan.

These filter bed lumps, while of similar chemical composition (silica and alumina) to portions of the batch briquettes, are of such physical nature (hard and dense) that solution by the liquid glass causes a minimum of erosion and dissolution.

The chemical proportions of the batch briquettes are predetermined, so that, with the relatively small solution from the filter lumps added, the final glass composition will be of the desired chemical proportion.

In addition to the advantages and objects recited in my previous application, in the way of economy of fuel, and greater melting capacity for a given size furnace, the present invention provides a means and a method whereby channeling of the molten glass during plaining thereof and uneven movement through the tank is prevented, thus producing glass of more uniform composition and temperature at a point where it is fed from or drawn off from the tank.

Another object of my invention is to provide an arrangement wherein the more refractory lumps referred to will be more effectively distributed for engagement with the molten glass materials as they move down through the stack, and to provide for better movement of heating gases upwardly through the stack, as well as to provide against choking of the stack at the lower end thereof in such manner as to prevent proper flow of the liquified materials from the stack to a tank.

Figure 3:
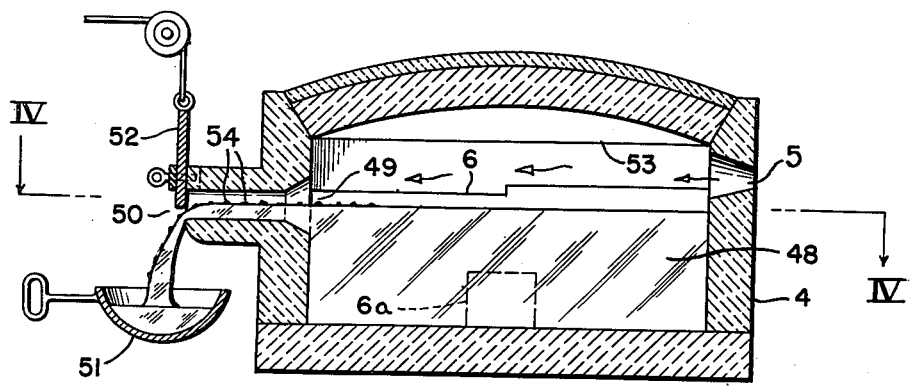

In the accompanying drawings, Figure 1 is a vertical sectional view through the melting furnace, Fig. 2 is a view taken on the line II—II of Fig. 1; Fig. 3 is a view taken on the line III—III of Fig. 4, and Fig. 4 is a sectional plan view of a portion of Fig. 1, on the lines IV—IV of Figs. 1 and 3.

The furnace comprises a tank 4 which may be of conventional form and provided with the usual burners 5 at its sides. A bridge wall 6 of conventional form serves as a skimmer, the wall having a passageway 6a at its underside through which the glass may flow to the discharge end of the tank. Cooling pipes 7 prevent overheating of the bridge wall. The end wall 8 of the tank serves as a dam which obstructs the flow of dregs or unmelted materials from a collecting basin or hearth 9 upon which the column of batch materials is supported while they are being melted.

A stack is supported upon the hearth and comprises front and rear walls 11 and 12 and end walls 13 and 14. A series of vertically-spaced baffles 15, 16 and 17 are carried by the wall 12, and burner openings 18, 19 and 20 are positioned below these baffles.

The front wall 11 carries baffles 22, 23 and 24 and 25 and has burner openings 26, 27 and 28. The baffle members extend substantially the full width of the stack and are shown as containing pipes such as 29 for cooling fluid. Also, they are sloped on their upper faces so that the batch materials as well as molten material will not accumulate thereon. The spaces between the lower faces of various baffles and the upper faces of the next lower baffles comprise combustion chambers, at the various burner openings 18, 26, etc.

The main body of batch materials is fed into the stack from a hopper 31, this material comprising the usual ingredients such as soda, lime and silica and will preferably be in the form of briquettes. Some large silica lumps or fused alumina lumps A may suitably be incorporated with the batch materials in 31, to assist in maintaining the height of the filter bed below the pastifying zone.

A second hopper 32 contains the more refractory materials such as silica brick or fused alumina or sintered alumina, or all three, in the form of lumps A that may be five to ten times larger than the briquettes B and ranging in size from perhaps two inches to about four inches in diameter. By using a mixture of lumps of various sizes, the erosion or solution of the lumps will be faster or slower. Thus the larger lumps will reach the hearth with less reduction in size than the smaller lumps which may be entirely dissolved before reaching the hearth. Also, lumps of the same size having different rates of solution will achieve a similar desired result. Otherwise the size reduction of lumps would be progressive and effective interstitial space reduced until the furnace would clog, or at least there would be loss in rate of production. By this varied solution rate of lumps, a stability of filter bed size can be achieved and a continuous uniform rate of melting be maintained.

There is thus always maintained in the stack a relatively great volume of the lumps, so as to maintain the filter bed character. The lumps will ordinarily occupy more than one-half the space in the stack. During melting of 100 tons of briquettes, probably less than 5% of the lumps will be dissolved.

The flow of materials from the hoppers is controlled by pusher members 33 and 34 which are operated periodically to push materials from the hoppers into the stack.

A number of the pusher bars 33 and likewise the pusher bars 34 are arranged in edge-to-edge relation across the width of the furnace, so that they can be selectively operated to feed the materials into the furnace at different rates, at various locations along the width of the furnace.

The lumps A are intermingled with the other batch materials during movement of the column of batch down the stack and, being more refractory (both as to temperature and solution) than the briquettes B, will tend to accumulate in the form of a filter bed supported by the hearth 9. Under ideal conditions, the batch briquettes will melt and move down over and between the coarser lumps, the liquid soda, silica and lime slowly dissolving the larger lumps. However, if a congestion of unassimilated or undissolved lumps of too small size occurs on the hearth 10 in a manner to obstruct flow of the molten glass to the tank 4, a gate or valve 36 will be opened occasionally to allow discharge of the smaller lumps and consequent replacement thereof by larger lumps moving down through the stack. As is well known, the melting temperature of the ingredients in the briquettes is approximately 2000° F., while the silica has a melting temperature of about 3200° F. and the alumina about 4300° F. The temperature in the stack will usually be below 3200° F.

The zig zag shape of the column produced by the staggering of the baffles not only provides some support for the column at various vertical levels and avoids consequent too great compacting of the materials at the bottom of the stack, but also facilitates the filling of the entire shaft section below the pastifying zone (about at the baffle 16) with the larger lumps. Thus the briquettes and the large lumps are separate in the upper portion of the shaft where both have interstitial space for the passage of heating flames, while the lower part of the stack is filled with the more refractory lumps over which the less viscous glass flows in a thin film, without unduly obstructing the spaces for the upward flow of the heating gases.

Also, since the burners at the front and rear sides of the stack are distributed throughout substantially the entire width of the stack, better heat control is possible, and the materials at various points throughout the width of the stack can be melted at approximately the same rate, with elimination of channeling and the provision of an even flow of glass into and through the tank 4. The composition of the glass and the temperature thereof will also be more uniform than if the major portion of the heat were supplied simply through burners not spaced horizontally along the stack walls.

Burner flames or heating gases from the burners flow into and through stack in directions indicated by the light arrows and thence into the hoppers 31—32, whence they are drawn off either by forced draft or stack draft through outlet pipes 37 and 38 that are controlled by dampers 39 and 40. Header pipes such as 42 are provided, and a number of the outlets 37 and 38 are distributed along the width of the furnace so that by operating the dampers, the flow of heating gases through the hoppers can be controlled at various laterally-spaced zones. Spacing of the burner rows vertically serves as a means for controlling the temperatures at various levels, for varied glass tonnage and to control the melting and plaining for such varied tonnage.

The softened and molten glass moves downwardly in the direction indicated by the black arrows. The briquettes can be heated nearly to a softened condition in the hopper 31, but should not become actually soft until they reach a point about opposite the baffle 15 which may be called the pastifying zone. From there downwardly, the briquettes will become increasingly fluid until the hearth 9 is reached, at which time the molten material of the briquettes, together with the absorbed silica will flow to the furnace chamber or refining hearth 4.

A heat exchanger 44 is provided for preheating air that is supplied from a pipe 45 and through a pipe or pipes 46 to the various burners. This air is preheated by gases flowing from the furnace 4 through a conduit 47 and thence through the heat exchanger.

In Figs. 3 and 4, which respectively show vertical cross sectional and sectional plan views of the tank 4, I show an arrangement for removing accumulations of foreign matter such as small floating particles of silica from the surface of that portion 48 of the batch between the walls 6 and 8. To this end, I position two of the burners 5 at points slightly in advance of the bridge wall 6, the burner flames or gases being directed across the surface of the glass as indicated in these two figures. This causes the scum 54 on the glass to be blown through a discharge port 49 in the side wall of the tank from whence it will flow through an extension 50 into a ladle or chute 51. A gate valve 52 is provided for cutting off flow of heated glass and gases through the opening 49 when no skimming is required. The flat arch at 53 gives a good flame velocity.

Further with respect to the avoidance of channeling of the molten glass stream, and the maintenance of an even flow across the entire length of the end wall 8, the refractory lumps from the hopper 32 can be fed in various quantities at desired points along the width of the stack, through individual operation of slides 34, and likewise with respect to the slides 33. This procedure, together with the individual control of the various burners at the burners openings 18, 19 and 20 respectively, at horizontally-spaced points along the width of the furnace, and likewise with respect to the rows of burners 26, 27 and 28 at the opposite side of the furnace, insures evenness or uniformity of melting or flow within the stack and on the hearth 9.

I claim as my invention:

1. A glass-melting furnace having a hearth and a stack for receiving a column of glass-making materials, a plurality of baffles at opposite sides of the stack and projecting into the path of the materials as they move downwardly to the hearth, the baffles at each side being vertically offset with respect to the baffles at the other side of the stack, and means for directing burner gases into the column, from points below the various baffles, the baffles extending approximately the full width of the stack, at said opposite sides, and the burner gases being supplied at a plurality of points spaced longitudinally of the baffles.

2. A glass-melting furnace having a hearth and a stack, means for introducing a stream of finely-divided glass-making materials into the upper end of the stack, at one side thereof, means for introducing relatively large lumps of glass-making materials into the opposite side of the stack, a baffle on one stack wall, retarding flow of the fine material downwardly in the stack, a baffle on the opposite stack wall, for retarding downward flow of the lumps, the second-named baffle being at a lower level than the other baffle, to direct the lumps into the path of the fine materials, at a plane below the first-named baffle, and means for directing heating gases through the materials in the column thus formed.

3. A glass-melting furnace having a hearth and a stack, means for introducing a stream of finely-divided glass-making materials into the upper end of the stack, at one side thereof, means for introducing relatively large lumps of glass-making materials into the opposite side of the stack, a baffle on one stack wall, retarding flow of the fine material downwardly in the stack, a baffle on the opposite stack wall, for retarding downward flow of the lumps, the second-named baffle being at a lower level than the other baffle, to direct the lumps into the path of the fine materials, at a plane below the first-named baffle, and means for directing heating gases through the materials in the column thus formed, there being a succession of baffles below the first-named baffles, with the baffles at each side of the stack being vertically offset with respect to adjacent baffles on the opposite wall of the stack, whereby the materials of the column move to the hearth in a zig zag path.

4. A glass-melting furnace comprising a tank, a melting hearth positioned to deliver molten glass to the tank and being approximately the same width as the tank, a stack for supporting a laterally confined column of material on the hearth and of a width approximately equal to the width of the hearth, baffles in the stack, extending horizontally the full width thereof and positioned to retard downward flow of the material in the stack, and burners disposed beneath the baffles in positions to direct heating gases into the column of materials, at a plurality of points throughout the width of the stack.

5. A glass-melting furnace having a hearth and a stack for receiving a column of glass-making materials, a distributing tank for receiving molten glass from the hearth, in the form of a horizontally-moving stream and means for directing a blast of heated gases across the surface of the stream, in a direction to blow scum from the surface of the glass.

6. A glass-melting furnace having a hearth and a stack for receiving a column of glass-making materials, a distributing tank for receiving molten glass from the hearth, in the form of a horizontally-moving stream, and means for withdrawing unmelted glass-making materials through the hearth, to permit replacement thereof by larger lumps of glass-making materials.

7. A glass-melting furnace having a hearth and a stack for receiving a column of glass-making materials, a distributing tank for receiving molten glass from the hearth, burners for directing heating gases into the stack, burners for directing heating gases to the surface of the glass in the tank, a heat exchange device through which the last-named gases are passed, and conduits for conducting heated air from said heat exchanger to the first-named burners for combustion.

8. A glass-melting furnace having a hearth, a stack, and a distributing tank to which molten glass is discharged from the hearth, the stack being of a width approximately equal to the tank width, a hopper at one side of the stack for discharging glass batch briquettes into the stack, a hopper at the opposite side of the stack for discharging larger lumps of batch material into the stack, the two hoppers each being approximately equal in width to the width of the stack, and having a plurality of openings in their lower and upper ends for the flow of heating gases therethrough, the upper openings being spaced laterally of one another and having individual damper control, and means for directing heating gases upwardly through the stack and into the hoppers.

9. A glass-melting furnace having a hearth, a stack, and a distributing tank to which molten glass is discharged from the hearth, the stack being of a width approximately equal to the tank width, a hopper at one side of the stack for discharging glass batch briquettes into the stack, a hopper at the opposite side of the stack for discharging larger lumps of batch material into the stack, the two hoppers each being approximately equal in width to the width of the stack, and pusher bars at the lower ends of said hoppers for feeding material at desired rates from said hoppers selectively.

10. The method of melting glass-making materials, which comprises feeding the materials to a melting hearth in the form of a column, the column being formed by a stream of the materials having the lower melting points, at the upper end of the column, and by a stream of lumps having a higher melting point, the second-named stream being introduced at a zone where it partly intercepts the first-named stream and retards the flow thereof into the column, whereby a substantial quantity of the said lumps move downwardly in the column, in advance of the materials of lower melting points, and heating the column of materials to a temperature at which the lower melting materials become liquified.

11. The method of melting glass-making materials, which comprises feeding the materials to a melting hearth in the form of a column, the column being formed by a stream of the materials having the lower melting points, at the upper end of the column, and by a stream of lumps having a higher melting point, the second-named stream being introduced at a zone where it partly intercepts the first-named stream and retards the flow thereof into the column, whereby a substantial quantity of the said lumps move downwardly in the column, in advance of the materials of lower melting points, the materials of the column being directed in a zig zag path of the hearth, and heating the column of materials to a temperature at which the lower melting materials become liquified.

12. The method of melting glass-making materials, which comprises forming a column of the materials, with the more refractory materials in the form of lumps and the materials of lower melting points in a more finely divided form, supplying the two classes of materials into the column at such rate that the more refractory lumps constitute a larger portion of the column than the other materials when they are in an unmelted condition, and heating the column to such degree that the less refractory materials are softened and begin to melt in the upper part of the column, and the liquified materials will flow over and between the said lumps effecting solution thereof while moving to the hearth.

13. The method of melting glass-making materials, which comprises forming a column of batch materials in the form of briquettes having relatively low melting points and lumps having a higher melting point, supplying heat to the column to form a softened zone of materials near the upper end of the column, maintaining a filter bed of the said lumps in the lower portion of the column, and subjecting the lower portion of the column to temperatures at which the materials of low melting temperature become liquified.

14. The method of melting glass-making materials, which comprises feeding the materials to a melting hearth in the form of a column, the column being formed by a stream of the materials having the lower melting points, at the upper end of the column, and by a stream of lumps having a higher melting point, the second-named stream being introduced at a zone where it partly intercepts the first-named stream and retards the flow thereof into the column, whereby a substantial quantity of the said lumps move downwardly in the column, in advance of the materials of lower melting points, and heating the column of materials to temperature at which the materials of lower melting points become liquified, the stream of materials having the lower melting points containing also a substantial quantity of lumps having relatively higher melting points.

15. The method of melting glass-making materials, which comprises introducing the materials into a stack that holds them in laterally confined vertical columnar form, and introducing heating gases into the column at various horizontally-spaced points along the width of the stack and at selectively controlled rates.

16. The method of melting glass-making materials, which comprises introducing the materials into a stack that holds them in laterally confined vertical columnar form, and introducing heating gases into the column at various horizontally-spaced points along the width of the stack, at opposite sides of the stack and at selectively controlled rates.

17. The method of making glass-making materials, which comprises feeding the materials into a stack to form a laterally confined vertical column therein, the materials being fed into the stack near the upper end thereof, at selectively-controlled, horizontally-spaced points, and supplying heating gases into the column at horizontally-spaced points and at a plurality of planes below the points at which the materials are introduced.

18. A glass-melting furnace having a hearth and a stack for receiving a column of glass-making materials, vertically-spaced baffles on the inner wall of the stack, in position to form combustion chambers between the baffles and to guide materials as they move downwardly in the stack, and individually-controlled gas burners for directing heating gases into the spaces between the baffles at relatively vertically and horizontally spaced points.

19. The method of melting glass-making materials, which comprises forming in a melting chamber a column of batch materials having melting points of widely different degrees, the more refractory material being piled on the chamber floor in the form of lumps that are larger than the particles of the less refractory materials and at all times during a melting operation constitute more than one-half of the volume in the column, and subjecting the column to temperatures at which the less refractory materials become liquified, the materials of lower melting points being directed in a molten condition downwardly through the pile of more refractory lumps and laterally from the lower end of the column.

20. The method of melting glass-making materials, which comprises forming in a melting chamber a column of batch materials having melting points of widely different degrees, the more refractory materials being piled on the floor of the chamber in the form of lumps that at all times during a melting operation constitute more than one-half of the volume in the column, and subjecting the column to temperatures at which the less refractory materials become liquified, the said lumps being of various sizes when fed into the column, and the materials of lower melting points being directed in a molten condition downwardly through the pile of more refractory lumps and laterally from the lower end of the column.

21. The method of melting glass-making materials, which comprises forming in a melting chamber a column of batch materials having melting points of widely different degrees, the more refractory materials being piled on the chamber floor in the form of lumps that at all times during a melting operation constitute more than one-half of the volume in the column, and subjecting the column to temperatures at which the less refractory materials become liquified, the said lumps being of various chemical composition, and the materials of lower melting points being directed in a molten condition downwardly through the pile of more refractory lumps and laterally from the lower end of the column.

22. The method of melting glass-making materials, which comprises forming in a melting chamber a column of batch materials having melting points of widely different degrees, the more refractory materials being piled on the chamber floor in the form of lumps that at all times during a melting operation constitute more than one-half of the volume in the column, and subjecting the column to temperatures at which the less refractory materials become liquified, the said lumps having varied resistances to solution by the liquified ingredients of lower melting points, and the materials of lower melting points being directed in a molten condition downwardly through the pile of more refractory lumps and laterally from the lower end of the column.

23. The method of melting glass-making materials, which comprises forming in a melting chamber a column of batch materials having melting points of widely different degrees, the more refractory materials being in the form of lumps that at all times during a melting operation constitute more than one-half of the volume in the column, and subjecting the column to temperatures at which the less refractory materials become liquified, the said lumps having varied resistances to solution by the liquified ingredients of lower melting points, and supplied into the column at such rates as to maintain them at an average size, and piled in filter bed arrangement on the floor of the melting chamber, and the material of lower melting points being directed in a molten condition downwardly through the pile of more refractory lumps and laterally from the lower end of the column.

GEORGE E. HOWARD.

REFERENCES CITED

The following references are of record in the file of this patent:

UNITED STATES PATENTS

| Number | Name | Date |
|---|---|---|
| Re. 20,828 | Powell | Aug. 16, 1938 |
| 805,139 | Hitchcock | Nov. 21, 1905 |
| 1,217,340 | Pease | Feb. 27, 1917 |
| 1,610,376 | Hitner | Dec. 14, 1926 |
| 1,889,510 | Amsler | Nov. 29, 1932 |
| 2,114,545 | Slayter | Apr. 19, 1938 |
| 2,262,069 | Turk | Nov. 11, 1941 |
| 2,294,373 | Batchell | Sept. 1, 1942 |
| 2,508,629 | Tanberg | May 23, 1950 |

FOREIGN PATENTS

| Number | Country | Date |
|---|---|---|
| 614,200 | Great Britain | Dec. 10, 1948 |